United States Patent
Breece et al.

[15] 3,636,509
[45] Jan. 18, 1972

[54] VEHICLE LOW COOLANT LEVEL INDICATING DEVICE

[72] Inventors: Burton W. Breece, Flint; Raymond Edwin Summerer, Grand Blanc, both of Mich.

[73] Assignee: General Motors Corporation, Detroit, Mich.

[22] Filed: Mar. 16, 1970

[21] Appl. No.: 19,924

[52] U.S. Cl. ............................................. 340/59, 340/244
[51] Int. Cl. .................................... B60q 1/00, G08b 21/00
[58] Field of Search .................... 340/59, 244 C, 244 E, 244; 200/61.2

[56] References Cited

UNITED STATES PATENTS

| 3,312,936 | 4/1967 | Huntzinger | 340/59 |
| 3,257,643 | 6/1966 | Jensen | 340/52 |
| 3,333,258 | 7/1967 | Walker et al. | 340/244 C |
| 3,350,710 | 10/1967 | Bridges | 340/59 X |

*Primary Examiner*—Alvin H. Waring
*Attorney*—J. L. Carpenter and Paul Fitzpatrick

[57] ABSTRACT

A device for indicating low coolant level in a vehicle radiator when the engine of the vehicle is started, for giving a continuous indication of such condition and for automatically indicating the proper working condition of the indicator device. The vehicle starter switch supplies battery voltage simultaneously to the indicator for testing purposes and to a circuit which modifies the voltage in accordance with the liquid level. A voltage corresponding to low liquid level triggers a silicon controlled rectifier which connects the indicator to the ignition switch and supplies it with battery voltage after the starter switch is opened.

3 Claims, 2 Drawing Figures

PATENTED JAN 18 1972 3,636,509

INVENTORS
Burton W. Breece, &
Raymond E. Summerer
BY
Paul Fitzpatrick
ATTORNEY

VEHICLE LOW COOLANT LEVEL INDICATING DEVICE

Our invention relates to indicating devices, and more particularly to a vehicle radiator fluid level indicator.

A liquid cooled automobile engine is in danger of overheating should a significant portion of the cooling fluid be lost from the system. The temperature indicating device on most vehicles gives no warning until the engine actually overheats, often in a location far from any convenient source of cooling fluid. It would be helpful in the case of insufficient coolant if the automobile had a cooling fluid level indicating device that would warn the driver of the situation before the engine could overheat. Such a device might include a probe suspended at a preset level in an automobile radiator which would activate a warning device if it lost contact with the cooling fluid. Unfortunately the modern pressurized automobile cooling system is a very unstable medium under dynamic operating conditions. Changes in liquid level caused by changing engine speed, uneven liquid surface from input to output in the cross flow radiator, and considerable frothing of the fluid at the surface make liquid level measurement uncertain and lead to spurious warning signals during vehicle operation. To avoid these problems our indicating device confines the operation of the liquid level indicating system to the time at which the vehicle engine is started, when the fluid is at rest with a sharply defined surface. This gives the vehicle operator sufficient warning to add fluid if necessary before he starts out on the road.

It is an object of the present invention to provide an improved fluid level indicating device that measures fluid level only during starting of the vehicle engine.

It is another object of the present invention to provide a warning system with a limited time for measurement whose indicating device, once actuated, remains actuated beyond the period of measurement.

It is a further object of the present invention to provide a condition indicating system which automatically tests and indicates the correct operation of the warning device upon actuation of the system.

Further objects and advantages of the present invention will be apparent from the following description, reference being made to the accompanying drawings wherein a preferred embodiment of the present invention is shown.

Figure 1:
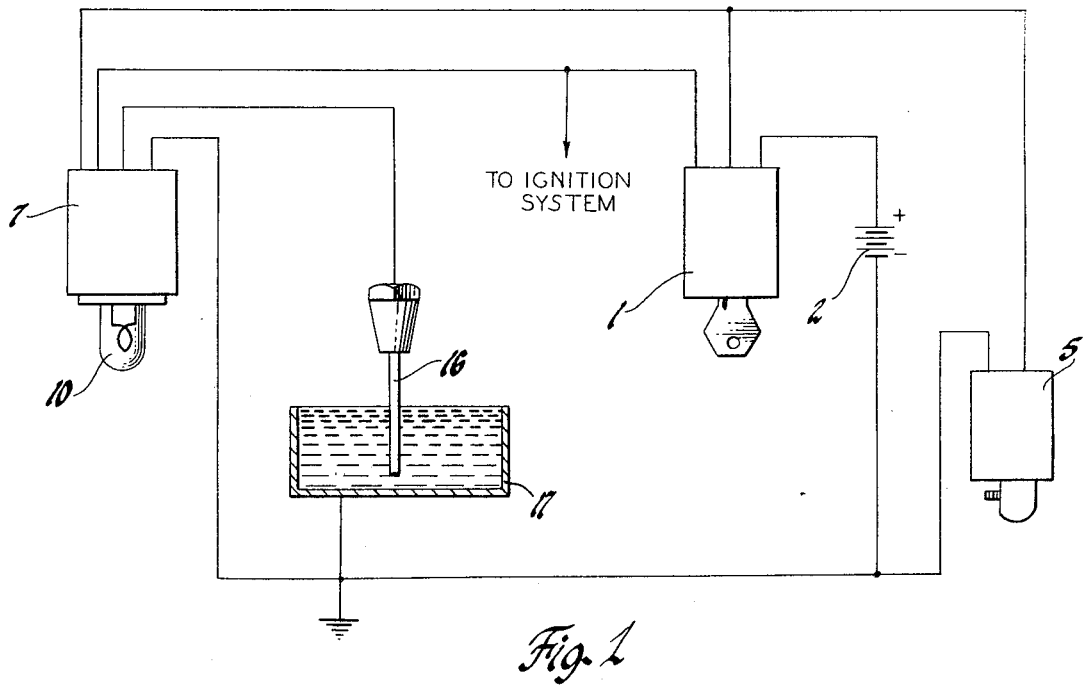
FIG. 1 shows a modular representation of the fluid level warning system in the environment of a motor vehicle.

Referring to FIG. 1, the ungrounded side of the battery 2 of the vehicle is connectable to the starter 5 and the ignition system through switches in the switch assembly 1. A probe 16 is mounted in the vehicle radiator 17, which is connected to the grounded side of the battery 2. The switch assembly 1, probe 16 and grounded side of the battery 2 are all connected to a warning circuit module 7 with an indicator, such as a lamp 10.

Figure 2:
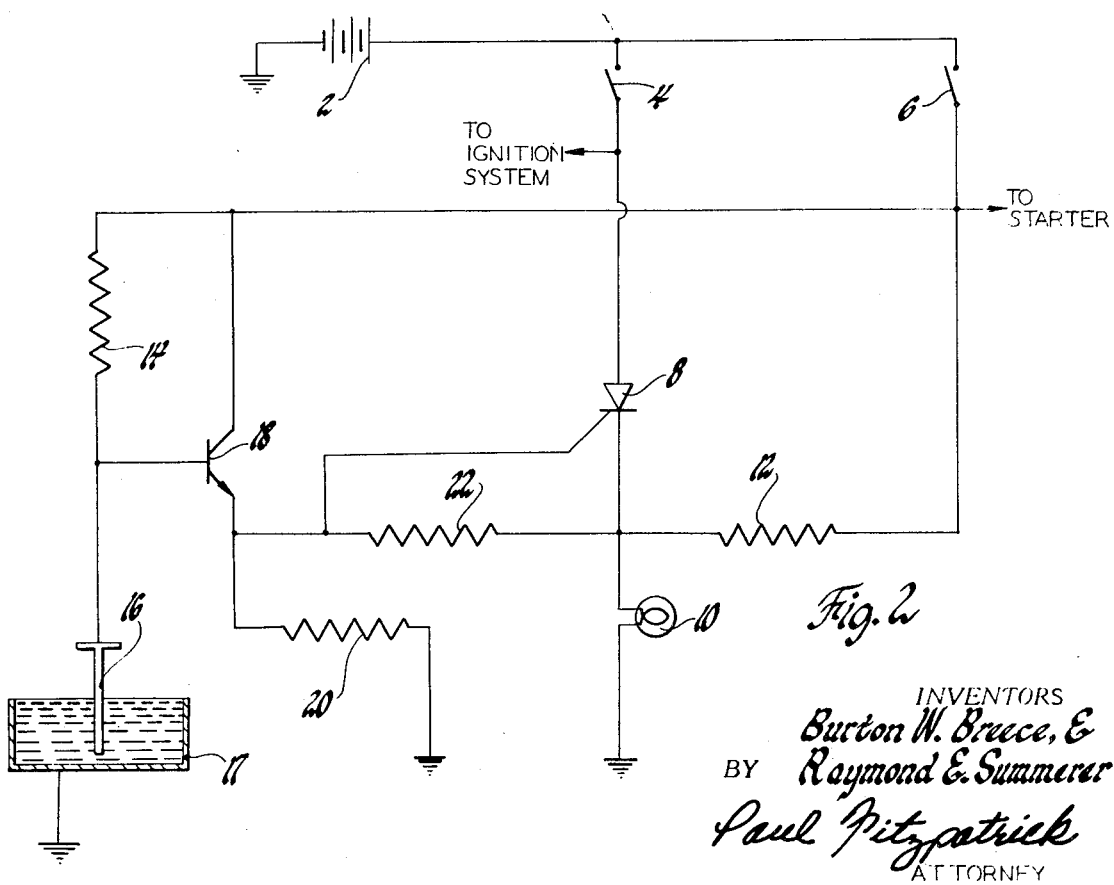
FIG. 2 is a diagrammatic representation of the warning circuit shown in FIG. 1.

The full circuit, including details of the warning circuit module, is shown in FIG. 2. The ignition 4 and starter 6 switches, both contained in switch assembly 1, connect the ignition system and the starter motor 5, respectively, to the ungrounded side of the battery 2. From a point between the ignition switch and the ignition system a silicon controlled rectifier (SCR) 8 and the indicator lamp 10 are connected in series to ground. From a point between the starter switch and the starter a resistor 12 is connected to the junction of the SCR 8 and the lamp 10. Another resistor 14 is connected from the junction of the starter switch 6 and the starter to the probe 16 which is mounted at a predetermined level in the vehicle radiator. If the water in the radiator is in contact with the probe a current path is provided to ground through the radiator itself. To the junction of this resistor and the probe is connected the base of a transistor 18. The collector of the transistor is connected to the junction of the resistor 14 and the starter switch 6, and the emitter of the transistor is connected to ground through a third resistor 20. The emitter of the transistor 18 is also connected, through a fourth resistor 22, to the junction of the SCR 8 and the lamp 10. Finally, the emitter of the transistor is connected directly to the gate of the SCR 8.

Now the operation of the circuit will be described. When the driver of the vehicle is ready to start his engine he first closes the ignition switch 4. This supplies battery voltage to the SCR 8. However, the SCR does not conduct, since the gate voltage is below trigger voltage. The driver then closes the starter switch 6 to actuate the starter motor. Battery voltage is now supplied to the lamp through resistor 12, and the lamp 10 lights to indicate that it is working properly. At the same time the battery voltage is supplied both to the collector of the transistor 18 and to the voltage divider formed by resistor 14 and the radiator mounted probe 16. If the water in the radiator is in contact with the probe an easy path to ground is formed and most of the battery voltage is dropped across resistor 14. Thus the voltage on the base of the transistor is near ground. Resistors 20 and 22 also form a voltage divider which fix the emitter voltage of the transistor at a value low enough to prevent the SCR 8 from conducting but high enough to keep the transistor 18 in cutoff. Under these conditions when the engine has been started and the starter switch released the lamp 10 will have its voltage removed and will turn off.

If, however, the water in the radiator does not contact the probe 16 at the time the vehicle starter switch 6 is closed the voltage at the base of the transistor 18 will go up to near battery voltage and the transistor will go into saturation. The increased current through resistor 20 will cause the emitter voltage of the transistor to increase until the SCR 8 is triggered. Now when the driver opens the starter switch the lamp is still supplied with battery voltage through the SCR which remains conducting regardless of its gate voltage until the ignition switch is opened.

It is obvious that the utility of this invention can be extended to any system with an auxiliary liquid container whose liquid level must be monitored, and especially where the liquid level loses its measurability during the system's operation. In addition, it should be clear that the exact devices described in the specification are for descriptive purposes only; the invention could be practiced with equivalent devices.

We claim:

1. A warning system for indicating low fluid level in a reservoir associated with an engine, the reservoir containing fluid subject to agitation during the operation of the engine; the engine including means operable to condition the engine for operation, an engine starter and starter energizing means; the warning system comprising liquid level sensing means, an indicator, means coupled to the starter energizing means effective to energize the sensing means and the indicator during operation of the starter, and lock-in means responsive to an indication of low liquid level from the sensing means to maintain the indicator in an energized condition after the starter energizing means is deactivated.

2. A warning system for indicating fluid level in a reservoir associated with an engine, the reservoir containing fluid subject to agitation during the operation of the engine; the engine including means operable to condition the engine for operation, an engine starter and starter energizing means; the warning system comprising liquid level sensing means, an indicator, means coupled to the starter energizing means effective to energize the sensing means and the indicator during operation of the starter and lock-in means responsive to an indication of low liquid level from the sensing means to energize the indicator through the engine conditioning means until the engine-conditioning means is deactivated.

3. A warning system for indicating low fluid level in a vehicle mounted reservoir containing fluid subject to agitation during operation of the vehicle; the vehicle including an engine, an electric ignition system for the engine, a source of electric current at a certain voltage, a common current return, an ignition switch to connect the ignition system to the electric current source, an electric starter and a starter switch to connect the starter to the electric power supply; the warning system including, in combination, a first resistor, an indicator, the first resistor and indicator being connected between the starter side of the starter switch and the common return, a first voltage divider in parallel with the first resistor and indicator, said voltage divider comprising a second resistor and a third resistor in series, the third resistor having resistance varying with liquid level, a second voltage divider in parallel with the indicator, the second voltage divider comprising fourth and fifth resistors, a first semiconductor switch connecting the starter side of the starter switch and the midpoint of the second voltage divider, the first semiconductor switch having a voltage-sensitive switching gate connected to the midpoint of the first voltage divider, a latching semiconductor switch connecting the ignition side of the ignition switch to the indicator, said latching switch having voltage sensitive trigger means connected to the midpoint of the second voltage divider.

* * * * *